(12) United States Patent
Josse et al.

(10) Patent No.: US 10,042,066 B2
(45) Date of Patent: Aug. 7, 2018

(54) METHOD AND DEVICE FOR PASSIVELY AND AUTOMATICALLY WINDING SEISMIC SURVEY EQUIPMENT CABLE

(71) Applicant: CGG SERVICES SA, Massy (FR)

(72) Inventors: Florian Josse, Lorient (FR); Junya Konno, Massy (FR)

(73) Assignee: CGG SERVICES SAS, Massy (FR)

( * ) Notice: Subject to any disclaimer, the term of this patent is extended or adjusted under 35 U.S.C. 154(b) by 273 days.

(21) Appl. No.: 14/969,453

(22) Filed: Dec. 15, 2015

(65) Prior Publication Data
US 2016/0282495 A1 Sep. 29, 2016

Related U.S. Application Data

(60) Provisional application No. 62/137,878, filed on Mar. 25, 2015.

(51) Int. Cl.
*G01V 1/38* (2006.01)

(52) U.S. Cl.
CPC ............ *G01V 1/3843* (2013.01); *Y02A 90/36* (2018.01)

(58) Field of Classification Search
CPC .............................. G01V 1/3843; Y02A 90/36
USPC .......................................................... 367/16
See application file for complete search history.

(56) References Cited

U.S. PATENT DOCUMENTS

| 4,552,086 A | 11/1985 | Böe et al. |
| 4,721,180 A | 1/1988 | Haughland et al. |
| 4,724,788 A | 2/1988 | Ayers |
| 5,138,582 A | 8/1992 | Furu |
| 5,488,920 A | 2/1996 | Gjestrum |

(Continued)

FOREIGN PATENT DOCUMENTS

| CN | 202863746 U | 4/2013 |
| EP | 0 168 959 A1 | 1/1986 |
| EP | 2 639 601 A2 | 9/2013 |

OTHER PUBLICATIONS

Heidi M. Sosik, Sponsoring Agency: Office of Naval Research, "Patterns and Scales of Variability in the Optical Properties of Georges Bank Waters, with Special Reference to Phytoplankton Biomass and Production", <http://www.whoi.wdu/science/B/sosiklab/gbgom.htm>, Oct. 15, 2015.

(Continued)

*Primary Examiner* — Daniel L Murphy
(74) *Attorney, Agent, or Firm* — Patent Portfolio Builders PLLC

(57) ABSTRACT

A passive, automatic cable winding system is coupled by a cable to a seismic source or streamer and automatically adjusts a payout of the cable connecting the seismic source or streamer to a float. The passive, automatic cable winding system includes a tensioning system configured so that when the seismic source or streamer is deployed during a seismic survey the water exerts force on the seismic source or streamer and the passive, automatic cable winding system pays out the cable so that the seismic source or streamer is at the desired depth for the seismic survey. When the seismic source or streamer is pulled out of the water during recovery, the passive, automatic winding system reduces the length of the cable between the float and the seismic source or streamer, and thus reduces the chances of the cable becoming tangled during recovery.

20 Claims, 9 Drawing Sheets

(56) References Cited

U.S. PATENT DOCUMENTS

| | | |
|---|---|---|
| 7,957,220 B2 | 6/2011 | Howlid et al. |
| 8,570,829 B2 | 10/2013 | Hovland et al. |
| 8,593,905 B2 | 11/2013 | Gagliardi et al. |
| 8,817,574 B2 | 8/2014 | Elvestad |
| 8,854,922 B2 | 10/2014 | Vahilda et al. |
| 9,151,267 B2 | 10/2015 | Hine et al. |
| 2006/0266868 A1* | 11/2006 | Caamano ............ B65H 75/4413 242/397 |
| 2007/0019504 A1 | 1/2007 | Howlid et al. |
| 2009/0178887 A1* | 7/2009 | Reeves ................... A62B 1/10 182/239 |
| 2009/0316526 A1 | 12/2009 | Grall |
| 2011/0158045 A1 | 6/2011 | Karlsen et al. |
| 2014/0010044 A1 | 1/2014 | Hovland et al. |
| 2014/0112096 A1 | 4/2014 | Dowle et al. |
| 2014/0112097 A1 | 4/2014 | Dowle et al. |
| 2014/0204707 A1 | 7/2014 | Tonchia |
| 2014/0241123 A1 | 8/2014 | Sallas et al. |
| 2014/0314491 A1 | 10/2014 | Fraiche et al. |

OTHER PUBLICATIONS

RRM Seismic Workshop 2014, Rolls-Royce, Product Development, Current & Future Products, 2014.

* cited by examiner

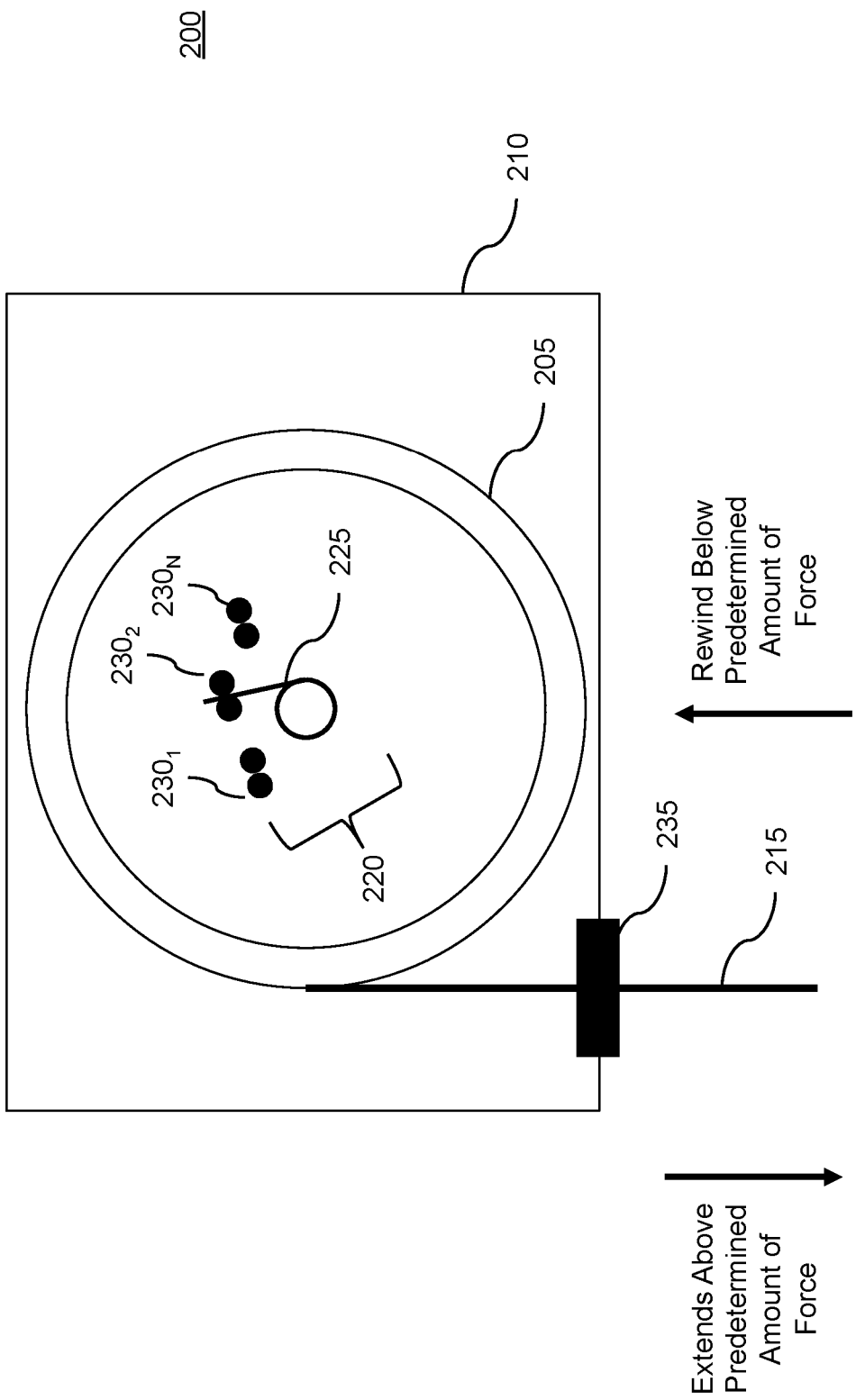

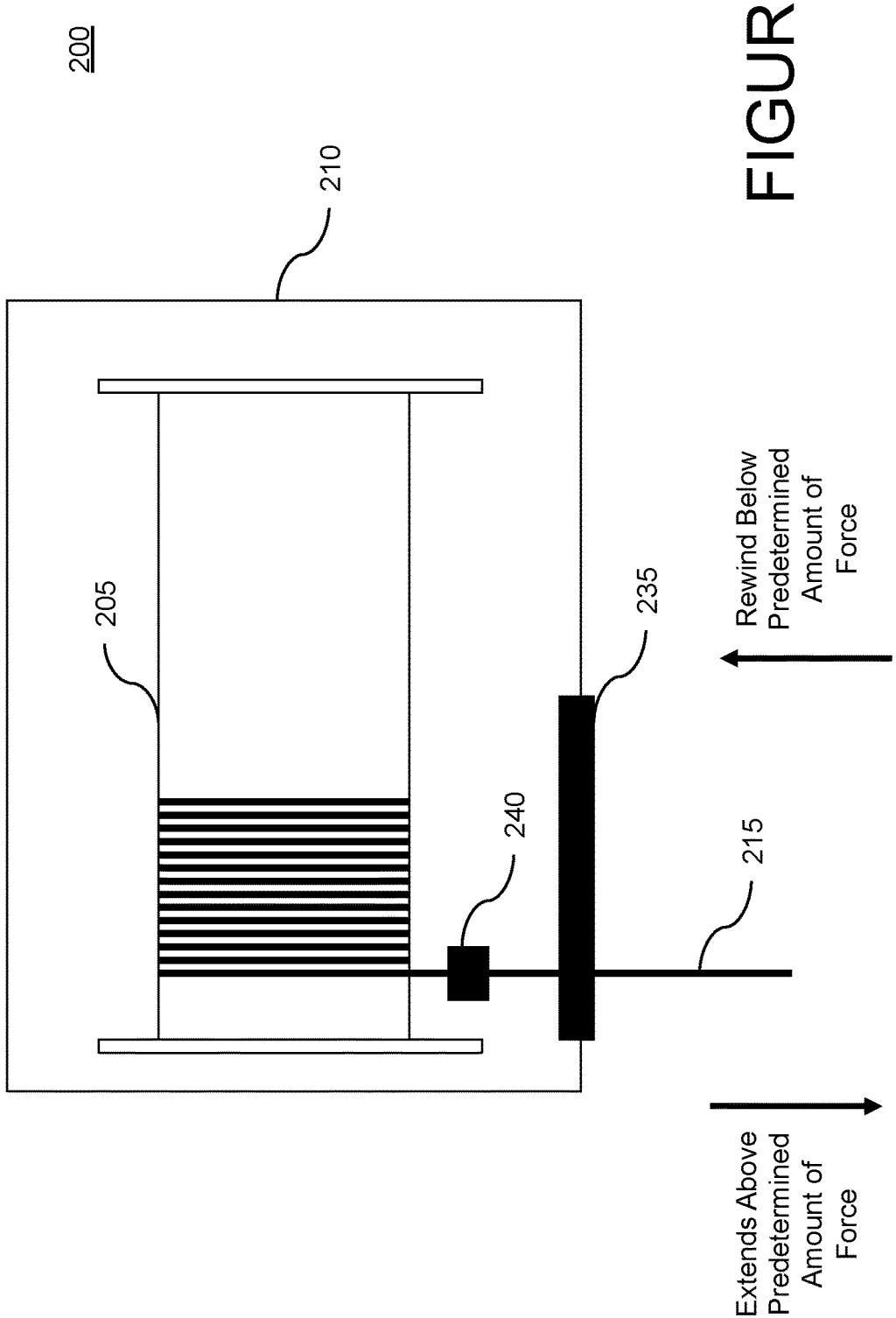

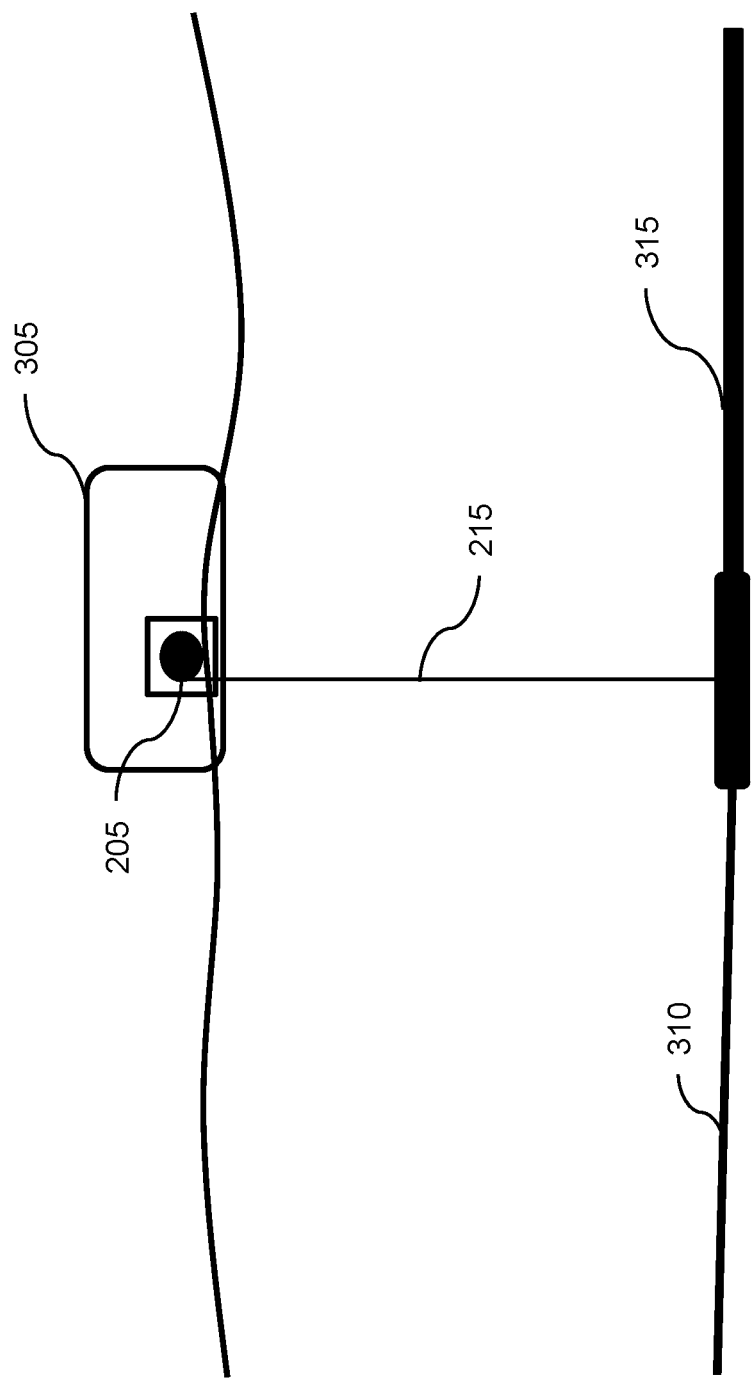

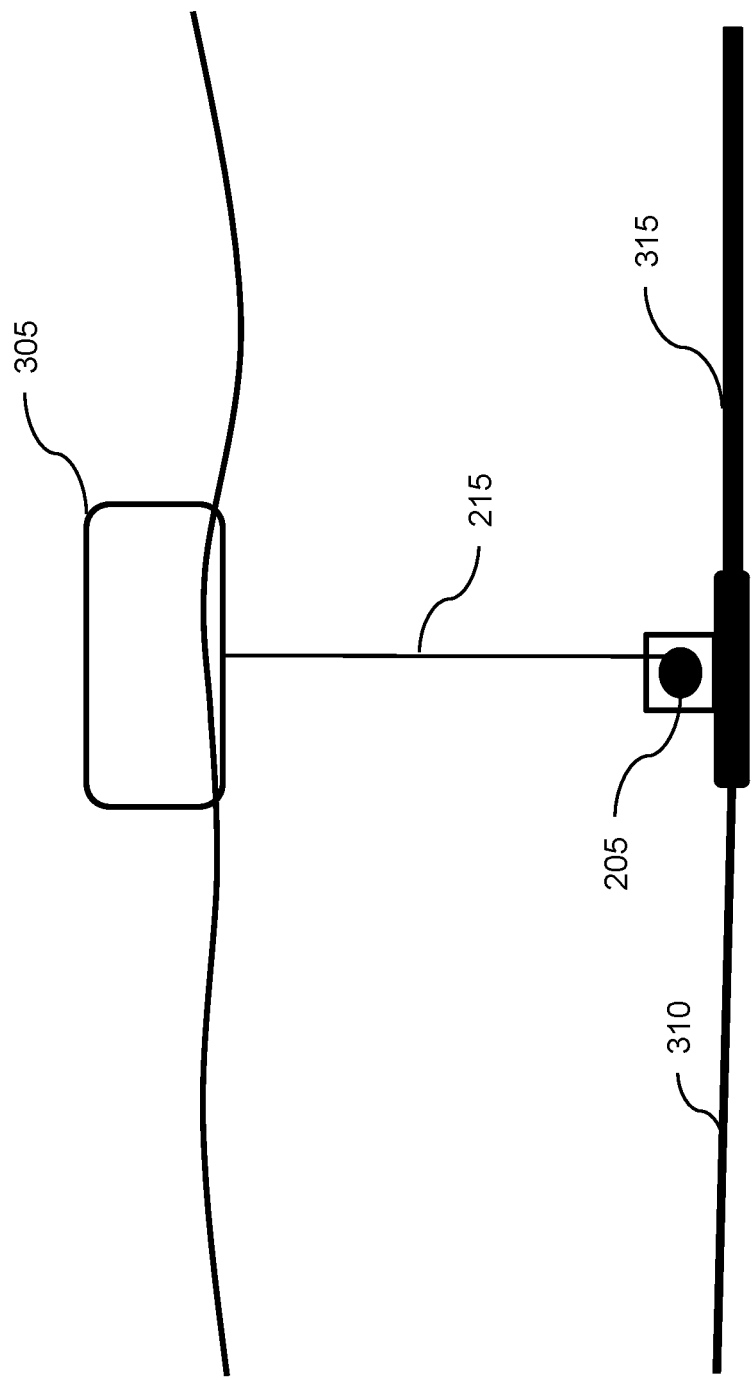

US 10,042,066 B2

METHOD AND DEVICE FOR PASSIVELY AND AUTOMATICALLY WINDING SEISMIC SURVEY EQUIPMENT CABLE

CROSS REFERENCE TO RELATED APPLICATIONS

This application claims priority and benefit from U.S. Provisional Patent Application No. 62/137,878, filed on Mar. 25, 2015, for "Automatic Rewinding Reel for Seismic Source Depth Ropes," the entire content of which is incorporated in its entirety herein by reference.

BACKGROUND

Technical Field

Embodiments of the subject matter disclosed herein generally relate to marine seismic systems. More specifically, the embodiments relate to systems and methods for passively and automatically controlling the payout length of cables connecting seismic sources and/or receivers to floats.

Discussion of the Background

Marine seismic surveys involve a vessel towing one or more sources and one or more receivers across a survey area, which involves a number of cables connecting various parts of the marine seismic survey system. As illustrated in FIG. 1, a marine seismic survey system 100 includes a vessel 102 that tows a plurality of streamers 110 (only one is visible in the figure) and a seismic source 130. Streamer 110 is attached through a lead-in cable (or other cables) 112 to vessel 102, while source 130 is attached through an umbilical 132 to the vessel. A head float 114 floats at the water surface 104 and is connected through a cable 116 to a head end 110A of streamer 110, while a tail float 118 is connected through a similar cable 116 to a tail end 110B of streamer 110.

Source elements 136 are connected to float 137 by respective cables 135 so that the source elements 136 travel at desired depths below the water surface 104. During operation, vessel 102 follows a predetermined path T while source elements 136 emit seismic waves 140. These waves bounce off the ocean bottom 142 and other layer interfaces below the ocean bottom 142 and propagate as reflected/refracted waves 144 that are recorded by seismic receivers 122.

Deployment and recovery of the components of marine seismic survey systems can be complicated by any one of the various cables becoming twisted or tangled around other cables or components. This can damage components of the system, which can be quite costly. Even when components are not damaged, the delay incurred to untangle the cables and/or equipment can also be quite expensive because of the amount of fuel expended by the vessel as well as payment of the crew during this downtime.

Accordingly, it would be desirable to provide devices, systems and methods to reduce the possibility that cables can become twisted or tangled during deployment and recovery of seismic survey equipment.

SUMMARY

A passive, automatic cable winding system is coupled by a cable to a seismic source or streamer and automatically adjusts a payout of the cable connecting the seismic source or streamer to a float. The passive, automatic cable winding system includes a tensioning system configured so that when the seismic source or streamer is deployed during a seismic survey the water exerts force on the seismic source or streamer and the passive, automatic cable winding system pays out the cable so that the seismic source or streamer is at the desired depth for the seismic survey. When the seismic source or streamer is pulled out of the water during recovery, the passive, automatic winding system reduces the length of the cable between the float and the seismic source or streamer, and thus reduces the chances of the cable becoming tangled during recovery.

According to one embodiment there is a passive, automatic cable winding system for marine seismic surveys, which includes a cable reel, around which a cable is wound and a passive tensioner coupled to the cable reel, and configured so that the cable reel passively and automatically extends or rewinds the cable based on an amount of force the cable exerts on the cable reel relative to a predetermined tension limit.

According to another embodiment there is a method for controlling a distance between a float and a seismic streamer and a seismic source connected to the float by a cable. The method involves passively and automatically adjusting a length of the cable connecting the float to the seismic streamer or seismic source based upon an amount of force acting on the seismic streamer or seismic source relative to a predetermined tension limit.

According to yet another embodiment there is a seismic survey system that includes a float coupled to a towing vessel, a cable reel housed within the float, a measurement instrument, which is one of a seismic source or seismic streamer, a cable, which is wound around the cable reel, passes through the float, and is connected to the measurement instrument, and a passive tensioner coupled to the cable reel and configured so that the cable reel passively and automatically rewinds or extends the cable based on an amount of force exerted on the measurement instrument relative to a predetermined tension limit.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 2A and 2B are schematic diagrams of a passive, automatic cable for a winding system in two different views;

FIGS. 3A and 3B are schematic diagrams of a passive, automatic cable winding system connected to a seismic streamer;

FIG. 3C is a schematic diagram of a passive, automatic cable winding system connected to a seismic streamer in another configuration;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed with regard to the terminology and structure of marine seismic survey equipment. However, the embodiments to be discussed next are not limited to marine seismic survey equipment, but may be applied to other equipment that is coupled by cable that can become entangled during deployment or recovery.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

A passive, automatic cable winding system is provided in order to reduce the chances that cables connecting seismic streamers or sources with respective floatation devices become tangled during deployment and recovery of the seismic streamers or sources. The passive, automatic cable winding system passively and automatically controls an amount of cable paid-out based on a predetermined tension limit. When the cable is subject to a force less than the predetermined tension limit, the cable is automatically rewound on to a cable reel and when the cable is subject to a force greater than the predetermined tension limit the cable is automatically extended until a stop distance is reached.

Figure 1:
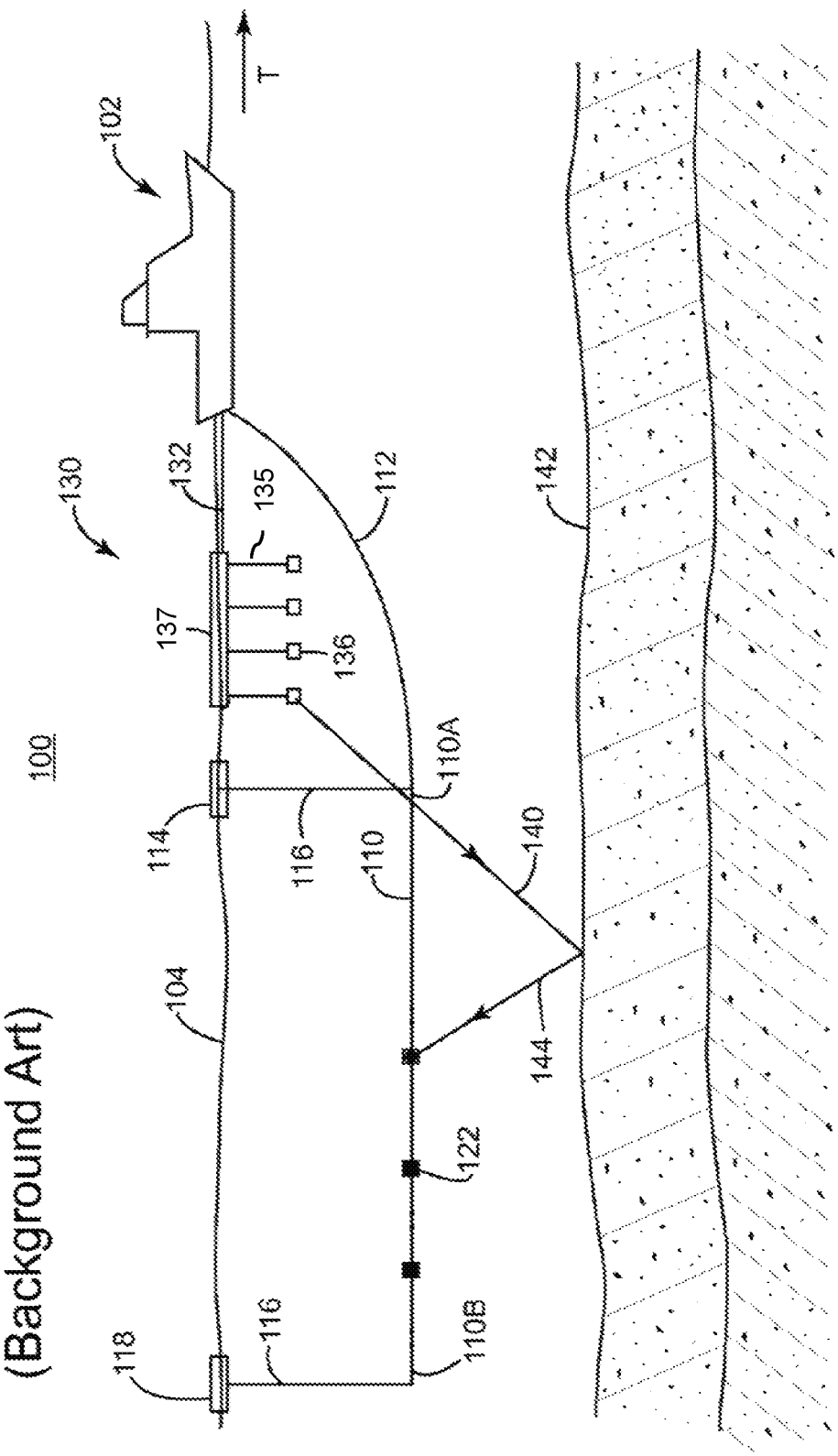
FIG. 1 is a schematic diagram of a marine seismic survey acquisition system.
Figure 3B:
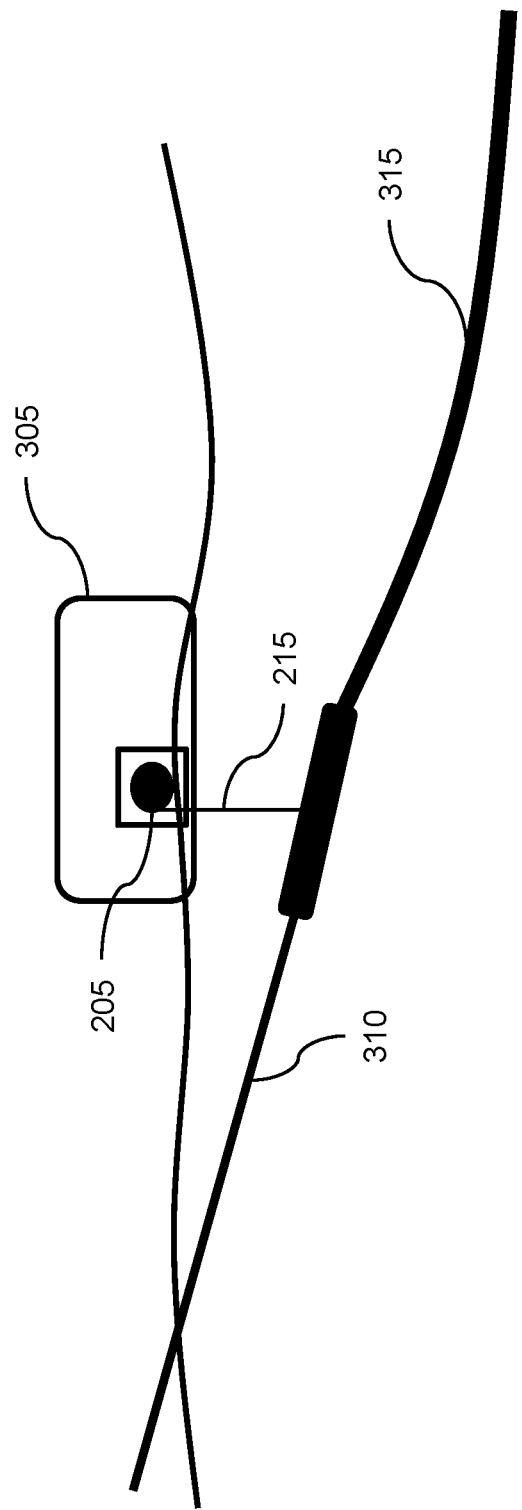
Figure 4A:
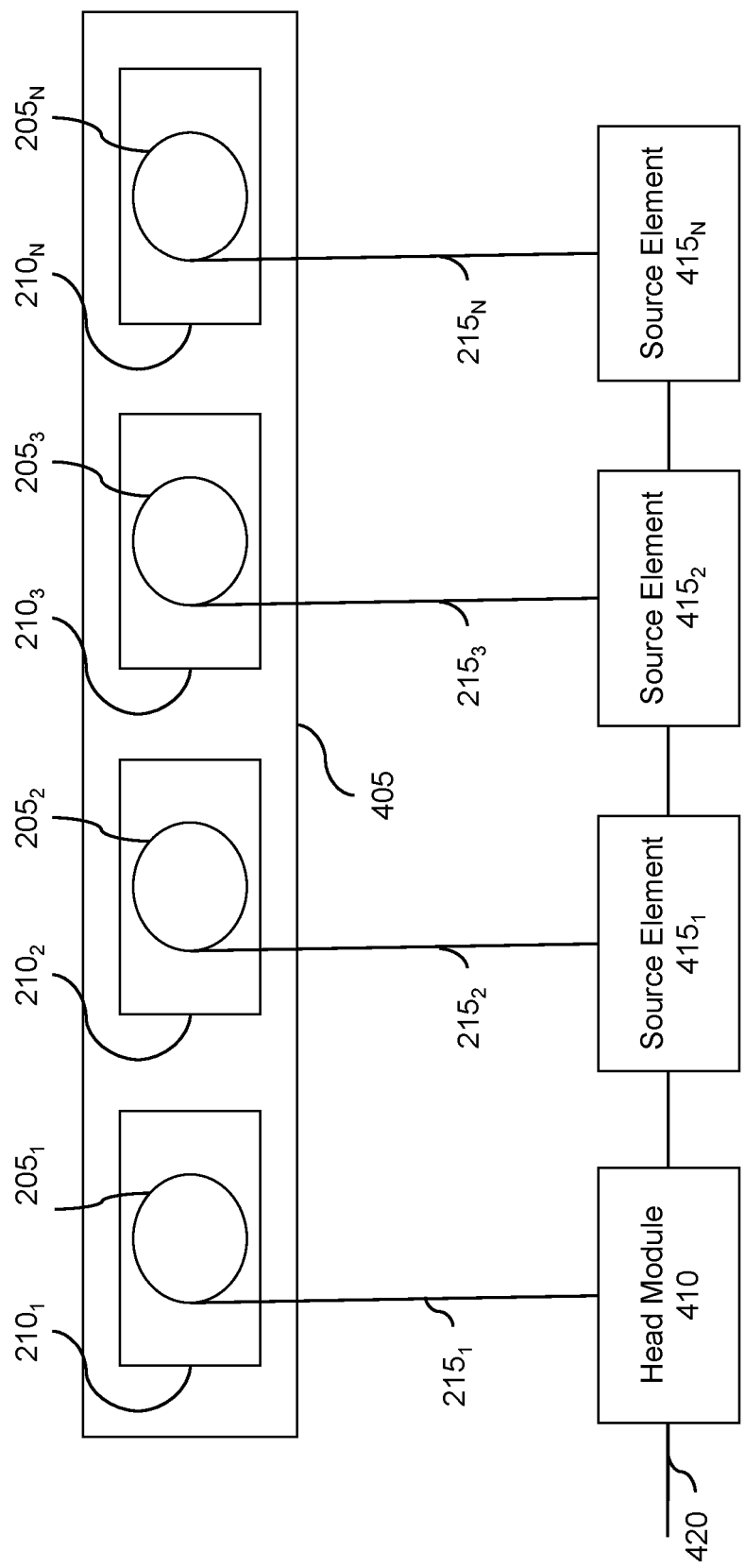
FIG. 4A is a schematic diagram of a passive, automatic cable winding system connected a set of source elements.
Figure 4B:
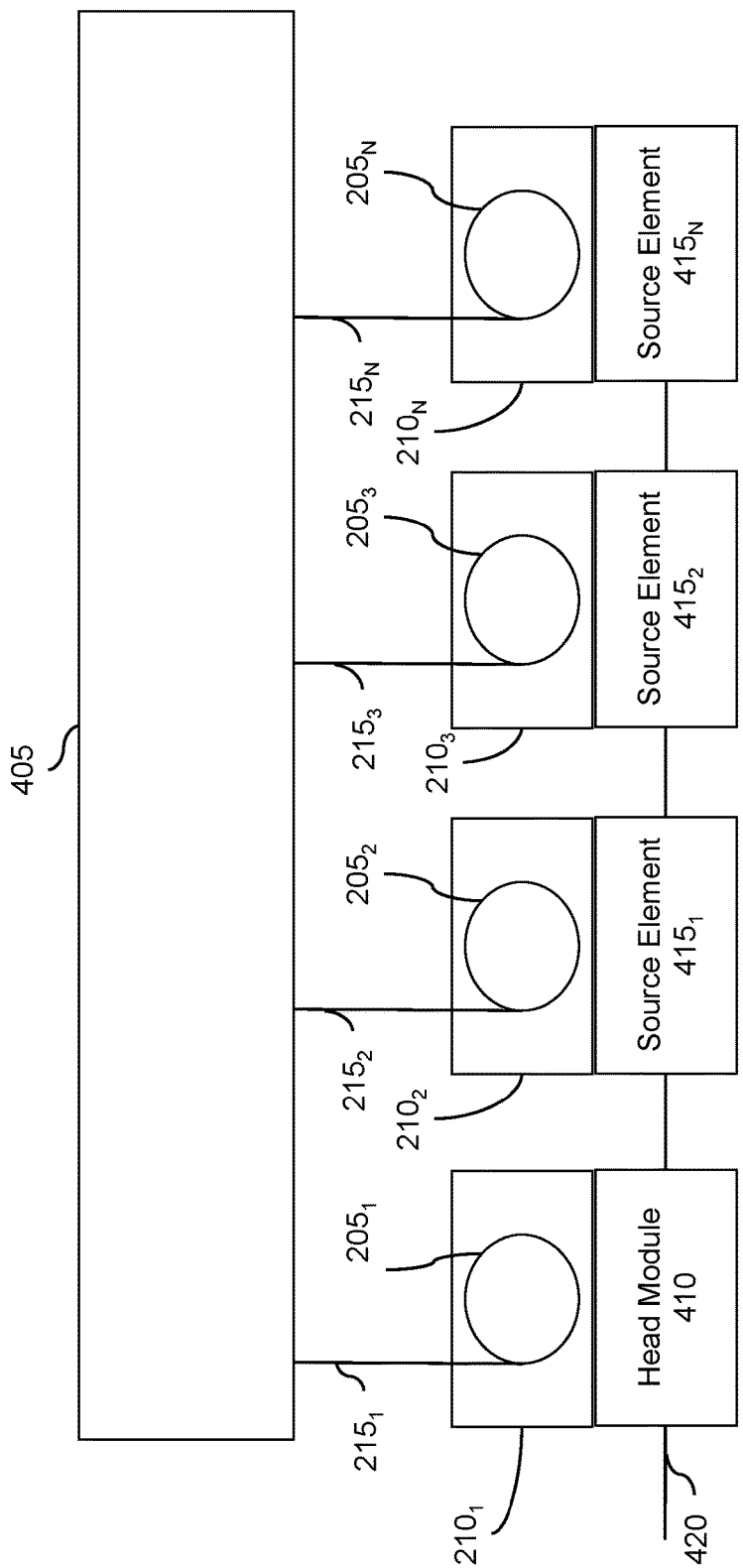
FIG. 4B is a schematic diagram of a passive, automatic cable winding system connected a set of source elements in another configuration.

FIGS. 2A and 2B illustrate a passive, automatic cable winding system that can be implemented with seismic sources and/or seismic streamers. The system 200 includes a cable reel 205 arranged within a housing 210, both of which can be arranged in a head and/or tail float (when implemented with a seismic streamer as in FIGS. 3A and 3B) or in a surface float (when implemented with a seismic source as in FIG. 4A). Alternatively, the cable reel 205 and housing 210 can be attached to the seismic streamer (as in FIG. 3C) or the seismic source (as in FIG. 4B). In the embodiments of FIGS. 3A, 3B, and 4A, one end of the cable 215 is wrapped around the cable reel 205 and the other end is coupled to a seismic source or seismic streamer (not illustrated). In the embodiments of FIGS. 3C and 4B the arrangement is reversed. A passive, automatic tensioning system 220 is coupled to the cable reel 205. The tensioning system includes a tensioning device 225, which in the figure is illustrated as a spring, as well as one or more pairs of tensioning stops $230_1$-$230_N$. The tensioning system 220 is configured so that when cable 215 is subject to more than a predetermined amount of force (i.e., the tension limit) the cable reel 205 will unwind the cable 215 and when it is subject to less than the predetermined amount of force the cable reel 205 will rewind the cable 215. The predetermined amount of force can vary depending upon deployment but should be sufficient so that the force acting on a seismic source or receiver (depending upon whether the seismic source or streamer is attached to the cable) by the water during a seismic survey causes the cable 215 to unwind so that the seismic source or streamer is at an intended depth during a seismic survey. If more than one pair of tensioning stops $230_1$-$230_N$ are implemented the predetermined amount of force can be adjusted by moving the tensioning device 225 to different ones of the pairs of tensioning stops $230_1$-$230_N$. The housing 210 includes a seal 235 to reduce or prevent water infiltration into the housing 210.

As an alternative to the tensioning system 220 illustrated in FIG. 2A, the tensioning system can be implemented using any type of self-arrester system or retractable system used for cable delivery, such as arbor reels and retractable spring reels. Other examples of tensioning systems that can be adapted to used with the disclosed systems include tensioning systems used with badge holders (e.g., the arbor reels/spring reels sold by John Evans' Sons, Inc.), tensioning systems that are part of self-retracting lifelines (e.g., the Rebel™ self-retracting lifelines (BDI/SALA AD120A) sold by Global Equipment Company, Inc.), tensioning systems that include spring powered mechanical reels (e.g., the NEG'ATOR spring assemblies sold by AMETEK Hunter Spring, as well as self-arrestor systems.

Referring now to FIG. 2B, a stop 240 is coupled to cable 215 in order to control the amount of cable that is unwound from the reel 205, and in turn the depth of the seismic source or streamer. The stop 240 is restrained from further downward movement by a corresponding housing stop, which can be part of the seal 235 or a separate stop arranged within the housing 220. Stop 240 can be embodied in any form, such as two pieces of plastic or metal that are joined to each other, for example using a screw or bolt, around the cable 215 at any desired location. A second stop can be provided if a minimum payout length is desired regardless of the amount of force applied to the cable. The second stop can be arranged, for example, on a portion of the cable that is outside of the housing 210, and the housing itself acts as a counter-stop to the stop attached to the cable 215.

FIGS. 3A and 3B are schematic diagrams of the passive, automatic cable winding system when implemented with a seismic streamer. As illustrated in FIG. 3A, the reel 205 is arranged within a float 305, which can be a head float or a tail float. The cable 215 extending from the reel 205 is attached to a streamer 315, in the area where the lead-in 310 meets the streamer 315. In FIG. 3A the lead-in 310 and streamer 315 are in the water and being towed during a survey and thus are subject to a predetermined amount of force, which causes the cable 215 to extend from reel 205 to the desired survey depth. FIG. 3B illustrates the arrangement during deployment or recovery of the streamer array, and thus the lead-in 310 and streamer 315 are subject to less than the predetermined amount of force, which causes cable 215 to rewind onto reel 205.

FIG. 3C is a schematic diagram of the passive, automatic cable winding system when implemented with a seismic streamer in another configuration. In contrast to the configuration in FIGS. 3A and 3B where the reel 205 is arranged within a float 305 and the other end of the cable 215 is fixed to the streamer, in the configuration of FIG. 3C the reel 205 is attached to the lead-in 310 and/or streamer 315 and the other end of the cable 215 is fixed to the float 305. Other than the location of the reel 205, the system of FIG. 3 operates in the same manner as described above in connection with FIGS. 2A, 2B, 3A, and 3B.

FIG. 4A is a schematic diagram of the passive, automatic cable winding system when implemented with a seismic source. A plurality of cable reels $205_1$-$205_N$ and their respective housings $210_1$-$210_N$ are arranged within a surface float 405. A cable $215_1$-$215_N$ is wrapped around each of the cable reels $215_1$-$215_N$, which passes through the housing $210_1$-$210_N$ and surface float 405 and terminates at a head module 410 and source element $410_1$-$410_N$. The head module 410 is coupled to the vessel and to source elements $415_1$-$415_N$ by a cable 420, which is commonly referred to as an umbilical. Those skilled in the art will recognize that the head module 410 typically includes all or part of the command/control, energy supply, sensors, and/or communications to and from the vessel and it distributed energy, data, and receives feedback data from the source elements $415_1$-$415_N$.

The passive, automatic cable winding system operates in a similar manner to that described above in connection with FIGS. 2A, 2B, 3A, and 3B, and accordingly a detailed description of the operation will not be repeated here. Although FIG. 4A illustrates three source elements it will be recognized that more or less source elements can be employed. Further, although a single array of sources is illustrated, this arrangement can be employed for each array in a set of arrays.

FIG. 4B is a schematic diagram of another configuration the passive, automatic cable winding system when implemented with a seismic source. In contrast to the configuration of FIG. 4A in which the cable reels $205_1$-$205_N$ and their respective housings $210_1$-$210_N$ are arranged within a surface float 405 and the cables $215_1$-$215_N$ terminate on the head module 410 and source elements $415_1$-$415_N$, in the configuration of FIG. 4B the cable reels $205_1$-$205_N$ and their respective housings $210_1$-$210_N$ are arranged on or in the vicinity of the head module 410 (e.g., in the protection cage, which is not illustrated) and source elements $415_1$-$415_N$ and the cables $215_1$-$215_N$ terminate on the float 405. Otherwise, the configuration of FIG. 4b operates in a similar manner to those discussed above in connection with FIGS. 2A, 2B, 3A, 3B, and 4A. Although FIG. 4B illustrates four source elements it will be recognized that more or less source elements can be employed. Further, although a single array of sources is illustrated, this arrangement can be employed for each array in a set of arrays.

Figure 5:
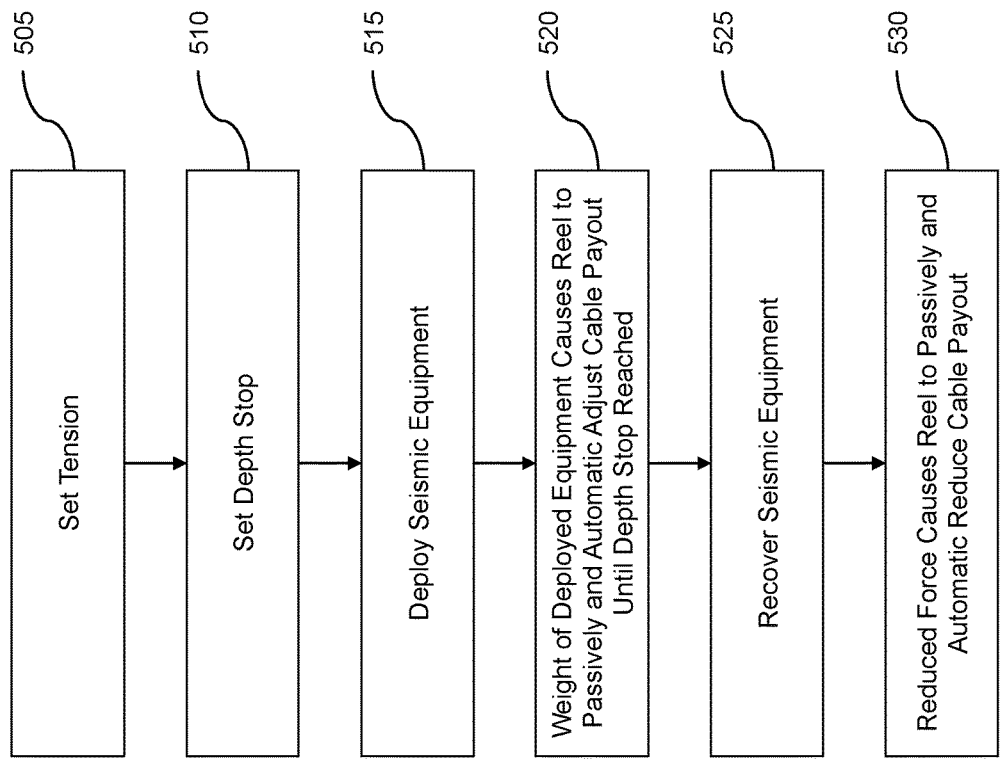
FIG. 5 is flowchart of an exemplary method for a passive, automatic cable winding system.

FIG. 5 is a flow diagram of a method performed by the passive, automatic cable winding system 200. Initially, the tension for the predetermined amount of force is set using, for example, the spring 225 and tensioning stops 230 (step 505). The maximum cable extension length is then set by attaching the depth stop 240 to the cable 215 (step 510). The seismic equipment is then deployed (step 515) and the weight of the seismic equipment causes the passive, automatic winding system payout the cable 215 at a defined speed until the depth stop is reached (step 520). While the equipment is in the water during the survey there will be sufficient force on the equipment and cable so that the cable stays at the length defined by the depth stop. As the seismic equipment is recovered onboard the vessel (step 525) the submerged equipment moves close to the water surface, which reduces the tension and causes the reel to passively and automatically reduce the cable payout (step 530).

Although FIG. 5 illustrates steps being performed in a particular order, these steps can be performed in a different order. For example, the depth stop can be set prior to setting the tension limit. Further, the passive, automatic winding will operate prior to deploying the seismic equipment due to the tensioner.

The disclosed exemplary embodiments provide a passive, automatic cable winding system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A passive, automatic cable winding system for marine seismic surveys, the system comprising:
    a float;
    a measurement instrument, which is one of a seismic streamer or a seismic source;
    a cable reel, around which a cable is wound, wherein the cable reel is attached to the float or to the measurement instrument; and
    a passive tensioner coupled to the cable reel and configured so that the cable reel passively and automatically extends or rewinds the cable based on an amount of force the cable exerts on the cable reel relative to a predetermined tension limit,
    wherein the cable reel connects the float to the measurement instrument.

2. The cable winding system of claim 1, further comprising:
    a cable stop coupled to the cable to limit an amount of the cable that can be dispensed by the cable reel.

3. The cable winding system of claim 2, wherein the cable stop is configured to be moveable between different positions along the cable.

4. The cable winding system of claim 2, wherein the system is comprised in a housing, the cable stop is coupled around the cable, and the cable stop limits the amount of cable that can be dispensed by the cable reel by contacting the housing.

5. The cable winding system of claim 4, wherein the housing includes an opening through which the cable passes, wherein the opening includes a water-tight seal.

6. The cable winding system of claim 1, wherein the system is enclosed within a float.

7. The cable winding system of claim 6, wherein the cable is coupled to the seismic source.

8. The cable winding system of claim 7, wherein the float includes a plurality of passive tensioners respectively coupled to a plurality of cable reels.

9. The cable winding system of claim 6, wherein the cable is coupled to the seismic streamer.

10. The cable winding system of claim 6, wherein the passive tensioner is a spring.

11. The cable winding system of claim 6, wherein the passive tensioner further comprises a plurality of tensioner stop pairs, wherein the predetermined tension limit is adjustable based on which of the plurality of tensioner stop pairs the cable is coupled to.

12. A method for controlling a distance between a float and a seismic streamer or seismic source connected to the float by a cable, the method comprising:
    passively and automatically adjusting a length of the cable connecting the float to the seismic streamer or seismic source based upon an amount of force acting on the seismic streamer or seismic source relative to a predetermined tension limit.

13. The method of claim 12, further comprising:
setting the predetermined tension limit by adjusting a tensioner.

14. The method of claim 13, wherein the predetermined tension limit is manually set.

15. The method of claim 12, further comprising:
setting a maximum payout length of the cable using a cable stop.

16. The method of claim 15, wherein the maximum payout length is manually set.

17. A seismic survey system, comprising:
a float coupled to a towing vessel;
a cable reel housed within the float;
a measurement instrument, which is one of a seismic streamer or seismic source;
a cable, which is wound around the cable reel, passes through the float, and is connected to the measurement instrument; and
a passive tensioner coupled to the cable reel and configured so that the cable reel passively and automatically rewinds or extends the cable based on an amount of force exerted on the measurement instrument relative to a predetermined tension limit.

18. The seismic survey system of claim 17, further comprising:
a cable stop coupled to the cable to limit an amount of the cable that can be dispensed by the cable reel.

19. The seismic survey system of claim 17, wherein the measurement instrument is a seismic source, and the float is a surface float housing a plurality of cable reels.

20. The seismic survey system of claim 17, wherein the passive tensioner is a spring coupled to a tensioner stop pair on the cable reel.

* * * * *